May 26, 1931.  F. D. CHAPMAN  1,806,609
CONTINUOUS COOKER
Filed Dec. 13, 1926  2 Sheets-Sheet 1

INVENTOR.
Frank D. Chapman,
BY Morsell, Keeney & Morsell
ATTORNEYS.

May 26, 1931. F. D. CHAPMAN 1,806,609
CONTINUOUS COOKER
Filed Dec. 13, 1926 2 Sheets-Sheet 2

INVENTOR.
Frank D. Chapman.
BY Morsell, Keeney & Morsell
ATTORNEYS.

Patented May 26, 1931

1,806,609

UNITED STATES PATENT OFFICE

FRANK D. CHAPMAN, OF BERLIN, WISCONSIN, ASSIGNOR TO BERLIN CHAPMAN COMPANY, OF BERLIN, WISCONSIN, A CORPORATION OF WISCONSIN

CONTINUOUS COOKER

Application filed December 13, 1926. Serial No. 154,521.

This invention relates to improvements in continuous cookers, more particularly adapted for cooking food in cans, and also for loading and unloading the cans of food to and from the cooker.

In continuous cookers or sterilizers for cooking food in cans, it is desirable to control the temperature, the agitation and the time period during the cooking process.

It is one of the objects of the invention to provide a continuous cooker having the above mentioned desirable features combined with others in a very simple manner.

A further object of the invention is to provide a continuous cooker in which the inner drum for moving the cans is closed circumferentially and at both ends, thus requiring a less amount of heating means for the enclosing tank.

A further object of the invention is to provide a continuous cooker having variable heating zones for maintaining different temperatures in the different zones.

A further object of the invention is to provide a continuous cooker in which variations in degree of cooking may be made without variations in the length of time the canned food passes through the machine.

A further object of the invention is to provide a continuous cooker in which the time and length of travel of the canned food through the machine may be varied without varying the speed of rotation of the parts.

A further object of the invention is to provide a continuous cooker having a plurality of compartments or heat zones which may be independently maintained at various temperatures to permit control of the time period in which the temperature of the food contained in the cans may be brought up to cooking degree and then cooled to the discharging degree desired.

A further object of the invention is to provide a continuous cooker having a number of inlet openings and a means which may be easily adjusted to feed cans to the tank through any of said openings.

A further object of the invention is to provide a continuous cooker having a feeding means which can be actuated from the driving mechanism of the drum in any of its positions of use.

A further object of the invention is to provide a continuous cooker having means for automatically discharging cans from the end portion of the cooker in a very simple manner.

A further object of the invention is to provide a continuous cooker which is of simple construction, is efficient in operation and is well adapted for the purpose described.

With the above and other objects in view, the invention consists of the improved continuous cooker and its parts and combinations as set forth in the claims, and all equivalents thereof.

In the accompanying drawings in which the same reference characters indicate the same parts in all of the views:

Fig. 1 is a side view of the improved continuous cooker with the can charging device shown in position for feeding cans through the first inlet opening;

Fig. 2 is a transverse sectional view taken on line 2—2 of Fig. 3;

Figure 3:
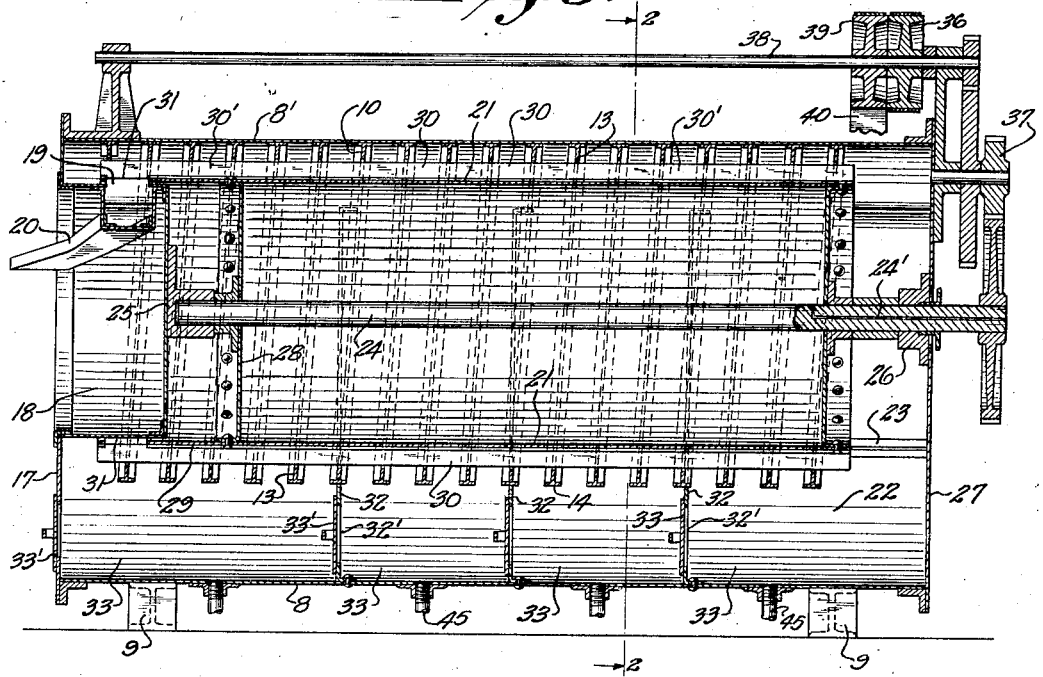
Fig. 3 is a longitudinal sectional view thereof.
Figure 4:
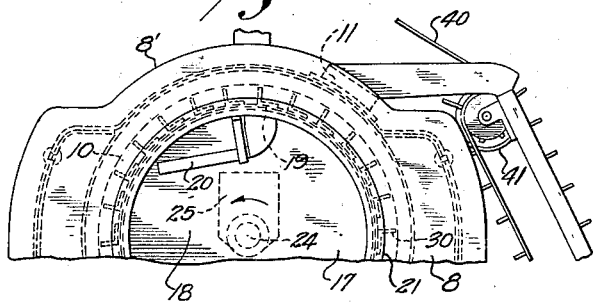
Fig. 4 is a detail view of the discharge end of the tank.
Figure 5:
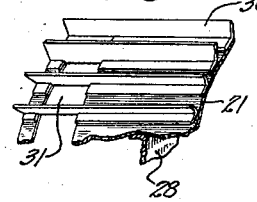
Fig. 5 is a detail perspective view of a portion of the cam moving drum.
Figure 6:
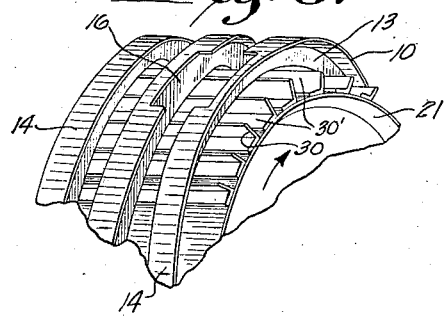
Fig. 6 is a detail perspective view of a forward end portion of the can moving drum and a portion of the fixed spirally trending guide.

Referring to the drawings, the numeral 8 indicates a tank which extends horizontally and is supported by legs 9 in any manner desired. The tank is of somewhat rectangular form in cross section with the upper wall 8' of curved formation to accommodate a portion of the spirally trending canway or guide 10, and to provide a comparatively large space beneath the drum mounted in the tank for holding comparatively a large amount of hot water to more easily maintain the desired temperatures in the heat zones. The tank is closed at both ends and is provided with a plurality of flanged inlet openings 11 in its upper curved portion 8'. Said inlet openings extend through the curved portion of the tank along one side thereof and are equidistantly spaced apart and provided with sealing covers 12, any one of which may be removed when it is desired to feed cans through any of the openings. The spirally trending guide 10 is formed of metal of T-shape in cross section, with the stem portion 13 thereof extending radially inwardly to form end guiding means for the cans. The other flange 14 of the guide extends spirally circumferentially on both sides of the radial flange and forms the supporting means upon which the cans 15 roll. Portions of adjacent spiral flange in alinement with the charging openings 11 are cut away, as indicated by the numeral 16, to permit feeding the cans therebetween to the spiral guide 10. The head 17 at the rear or discharge end of the drum is formed with an inwardly extending recess 18 of a diameter less than the diameter of the guideway 10 and concentric therewith, and the upper portion of said recess is provided with a discharge opening 19. A discharge spout 20 connected to the discharge opening 19 extends outwardly therefrom at an angle, so that the cans dropped through the discharge opening 19 will be deflected outwardly from the tank in the direction of rotation of the drum 21. The spiral guideway 10 is positioned in the upper portion of the tank and extends longitudinally thereof, so that comparatively a considerable space 22 is formed between the lower portion of the guideway and the bottom portion of the tank to contain a heating medium, as hot water or steam or both. The spiral is connected to the upper portion of the tank and is also supported upon longitudinally extending angle beams 23 connected to the tank. The drum 21 is closed at both ends and is mounted on a longitudinally extending shaft 24 which projects through the tank at one end and is provided with a vent bore 24' from the interior of the drum to the outside atmosphere. The inner end of the shaft is journaled in a bearing 25 connected to the inner side of the recessed end 18 while the opposite end portion extends through and is journaled in a bearing 26 connected to the inner side of the forward end 27 of the tank. The inner end 28 of the drum is recessed inwardly to permit the extending portion 29 to extend around and overlap the recessed portion of the tank, as clearly shown in Fig. 3. Angle bars 30 are mounted longitudinally in spaced relation on the drum to form in connection with the drum a can reel which rolls the cans around the spiral guideway in advancing the cans from one end of the tank to the other. The bars 30 are spaced apart a distance to accommodate the diameter of the cans and just clear the inner edges of the stem portions 13 and form in conjunction with the convolutions of the spiral member, pockets 30' for holding the cans during their travel through the tank. The inner end portion or extension of the drum which overlaps the recessed portion of the tank is provided with a discharge opening 31 which extends entirely around the drum and is in register with the discharge opening of the recessed tank end, so that as the cans are moved into register therewith they will drop downwardly through the opening 19 and out of the tank.

The tank between the spirally trending guideway and the inner opposite sides and lower portion of the tank is provided with transverse partions 32 which divide the tank into a number of compartments or heat zones 33 whereby the cans in passing therethrough may be subjected to varying temperatures as desired in processing different foods. The partions and the rear tank end are provided with manholes 32' closed by covers 33' for cleaning purposes.

An endless belt can elevator and feeder 34 is adapted to be positioned alongside of the tank and extends upwardly to one of the inlet openings 11 of the tank, the cover 12 to said opening of course being removed to connect the upper end of the elevator to the inlet openings. The lower end of the elevator may be secured to the floor by bolts 35.

The drum shaft 24 is rotated from a belt wheel 36 and interposed gearing 37. The belt wheel 36 is fast on a longitudinally extending shaft 38 which is positioned above and is mounted on the tank 8. A pulley 39 slidably splined on the shaft 38 has a belted connection 40 with a pulley 41 mounted on the upper shaft 42 of the endless belt feeder 34. As thus arranged, the pulley 39 may be moved along the shaft 38 to transmit rotation to the feeder in feeding cans through any of the charging openings of the tank.

Steam and water may be supplied to the different compartments 33 of the tank by valved pipes 43 and 44 so that the temperatures of said compartments may be controlled and varied as desired, and for convenience a thermometer 44 is provided for each compartment. Water is discharged from the compartments through the discharge pipes 45.

In use the tank is partly filled with hot water and steam is supplied to the tank to maintain the different temperatures in the different compartments as desired. The cans of food are fed into the tank through one of the openings by the endless conveyor and will drop by gravity on to the drum between the convolutions of the spiral and the longitudinally extending flanges of the closed drum. The drum in its rotation will carry the cans into and out of the water in each compartment and during said movement the cams will be moved towards the discharge end of the tank by the spiral convolutions. In their passage through the compartments, the cans will be subjected to more or less heat and agitation as they are moved through the different compartments or heat zones. If it is desirable in canning a food which requires a gradual increase in the cooking temperatures, the first compartment may be maintained at a predetermined temperature, the second compartment will have a higher temperature and the third compartment a still higher temperature, while the fourth compartment may have a still higher temperature or a lower one if it is desired to cool the cans somewhat before discharging the cans from the cooker. When the cans reach the discharge opening of the drum they will drop therethrough by gravity and into the discharge spout which will deflect them outwardly from the end of the tank. By having more or less water in the tank the degree of cooking and agitation may be controlled as the higher the water level the greater the cooking period and the amount of agitation as the cans will roll on the drum for a longer period of time. By shifting the can feed to a different inlet opening the length of the cooking period may also be controlled.

From the foregoing description it will be seen that the continuous cooker is of simple construction and is well adapted for the purpose described.

Particular attention is directed to the fact that the inner drum 21 is closed, so that water or steam cannot enter the space within the drum, with the result that it will take less heat to maintain the different heat zones at the desired temperatures, and furthermore the closed drum coacts with the partitions 32 in maintaining said zones of heat.

What I claim as my invention is:

1. A continuous cooker, comprising a horizontally extending tank having inlet and outlet openings and heat zones of various degrees of temperature, a spirally trending member extending through said tank and the heat zones, and a closed drum extending through the spirally trending member for preserving the heat zones, and having means coacting with the spirally trending member for moving cans through the heat zones.

2. A continuous cooker, comprising a horizontally extending tank having inlet and outlet openings and a plurality of compartments for maintaining various degrees of temperature in each compartment, and a carrier within the tank and extending through the compartments for moving cans from one portion of the tank to the other, said carrier formed in part of a closed drum for assisting in maintaining predetermined degrees of heat in each compartment.

3. A continuous cooker, comprising a horizontally extending tank having inlet and outlet openings and zones of various degrees of temperature for cooking food in cans passed therethrough, a spirally trending member extending through said zones, and a closed drum within the tank and extending through the spirally trending member and having means coacting with the spirally trending member for moving cans from one portion of the tank to the other, said drum coacting with the temperature zones in assisting to maintain the predetermined temperatures in said zones.

4. A continuous cooker, comprising a horizontally extending tank having inlet and outlet openings and partitions to form zones of various degrees of temperature for cooking food in cans passed therethrough, means controlling the temperature of said zones, a spirally trending member extending through said zones, and a rotary closed drum extending through the spiral member and the heat zones and coacting with the spiral member to move cans through said zones of varying temperature, said closed drum coacting with the partitions in preserving predetermined temperatures in said zones.

5. A continuous cooker, comprising a horizontally extending tank having inlet and outlet openings and a recessed rear end provided with a discharge opening, said tank also having zones of various degrees of heat, means for controlling the temperature of said zones, a spirally trending member extending through said heat zones and surrounding the recessed end of the tank, and a closed drum extending through the spirally trending member and the heat zones and having a discharge portion which extends around the recessed end of the tank and having a discharge opening which registers with the discharge opening of the tank, said drum coacting with the spirally trending member in moving cans from the inlet opening through the zones of varying temperatures and to the recessed end opening, said drum also coacting with the tank heat zones in preserving said heat zones.

6. A continuous cooker, comprising a horizontally extending tank having an inlet opening adjacent one end portion and a rounded recessed opposite end provided with an outlet opening in its peripheral portion, said tank also having transverse partitions for dividing the tank into compartment zones of various degrees of heat, means for controlling the temperature of said zones, a spirally trending member extending through said heat zones and surrounding the recessed end portion of the tank, a closed drum extending through the spirally trending member and the heat zones and having discharge portions which extend around the recessed end of the tank, said drum coacting with the spirally trending member in moving cans from the inlet opening through the heat zones and to the recessed end outlet opening, said drum also coacting with the partitions in preserving the heat zones, means for feeding cans to the inlet opening, and means for removing cans from the outlet opening.

7. A continuous cooker, comprising a horizontally extending tank having an inlet opening and a rounded recessed discharge end provided with an outlet opening in its upper peripheral portion, said tank also having transverse partitions dividing the tank into water compartment zones of various degrees of heat, means for controlling the temperature of the water in said zone compartments, a flanged spirally trending member extending through said heat zones and surrounding the recessed end portion of the tank, a rotary closed drum extending longitudinally through the spirally trending member and the heat zones and provided with parallel longitudinally extending bars between which the cans are maintained and slide in moving through the heat zones, end portions of said bars extending closely around the recessed portion of the discharge end of the tank and being formed to permit the cans to pass therebetween when in register with the peripheral discharge opening, said rotary drum coacting with the transverse partitions of the tank for preserving the heat zones, means for feeding cans to the inlet opening, and means for removing cans from the discharge opening.

8. A continuous cooker, comprising a horizontally extending tank having an inlet opening and a rounded recessed end portion at the discharge end of the tank provided with an outlet opening in its inner upper peripheral portion, said tank also having transverse partitions for dividing the tank into water compartment zones of various degrees of heat, water supply and discharge pipes connected to the different zone compartments, steam inlet pipe means for controlling the temperature of the water in said zone compartments, a flanged spirally trending member extending through said zones and surrounding the recessed end portion of the tank, a rotary closed drum extending longitudinally through the spirally trending member and the heat zones and provided with parallel longitudinally extending bars of angular form in cross section and between which the cans are maintained and slide in moving through the heat zones, end portions of said bars extending closely around the recessed portions of the discharge end of the tank and formed to permit the cans to pass therebetween when in register with the peripheral discharge opening, said rotary closed drum coacting with the tank partitions for preserving the heat zones, means for feeding cans to the inlet opening, and means for removing cans from the discharge openings.

9. A continuous cooker, comprising a horizontally extending tank having inlet and outlet openings and also having zones of different degrees of heat, a spirally trending member extending through said heat zones, and a rotary closed drum extending through the spirally trending member and coacting therewith in moving cans from the inlet to the outlet opening, said drum having an extension provided with an opening at its discharge end to permit cans to drop therethrough when in register with the discharge opening of the tank.

10. A continuous cooker, comprising a horizontally extending tank having a plurality of water compartments of comparatively considerable depth for holding water at different temperatures, a spirally trending member mounted in the drum, a closed drum extending through the spiral member and partly submerged in the water and rotating for moving cans of food through the water from one compartment to the other and in the same continuous path, said closed drum also coacting with the spiral member in maintaining the different temperatures in the different water compartments, and means for controlling the temperatures of the water in the different compartments to vary the degree of cooking of different kinds of food in the cans.

11. A continuous cooker, comprising a horizontally extending tank having a plurality of inlet openings and an outlet opening and heat zones of various degrees of temperature, a spirally trending member extending through said tank and the heat zones, a closed drum extending through the heat zones and the spirally trending member for preserving the heat zones and for moving cans of food therethrough, and means for feeding cans through any of the inlet openings.

12. A continuous cooker, comprising a horizontally extending tank having a plurality of inlet openings and an outlet opening and heat zones of various degrees of temperature, a spirally trending member extending through said tank and the heat zones, a closed drum extending through the heat zones and the spiral trending member for preserving the heat zones and for moving cans of food therethrough, means for maintaining various temperatures in the heat zones, means connectible to any of the openings for feeding cans therethrough, and means forming part of the drum for permitting cans to drop from the carrier through the discharge opening of the tank.

13. A continuous cooker, comprising a horizontally extending tank having a plurality of inlet openings in its upper portion and a recessed end portion formed with an outlet opening in its upper portion, transverse partitions dividing the lower and opposite side portions of the tank into heat zones of various degrees of temperature, a spirally trending member extending in the upper portion of the tank and through the heat zones and around the recessed end opening, a closed drum extending through the heat zones and having spaced longitudinally extending radial flanges which project around the recessed end portion of the tank for moving cans through the heat zones to the discharge opening of the recessed end, said drum also aiding in maintaining the different temperatures in the heat zones, and an endless conveyor connectible to any of the inlet openings for feeding cans therethrough.

14. A continuous cooker, comprising a horizontally extending tank having a plurality of inlet openings in its upper portion and a recessed end portion formed with an outlet opening in its upper portion, transverse partitions dividing the lower and opposite side portons of the tank into heat zones of various degrees of temperature, a spirally trending member extending in the upper portion of the tank and through the heat zones and around the recessed end opening and having cut-away portions in register with the tank inlet openings to permit cans to pass therethrough to the drum, a closed drum journaled in the tank and extending through the heat zones and spiral member and having spaced longitudinally extending radial flanges which coact with the spiral member in moving cans through the heat zones, said radial flanges extending around the recessed end portion and its opening to discharge cans therethrough, means for maintaining predetermined degrees of temperature in the heat zones, and means for feeding cans therethrough.

15. A continuous cooker, comprising a horizontally extending tank having a plurality of inlet openings and an outlet opening and heat zones of various degrees of temperature, a spirally trending member extending through said tank and the heat zones, a can carrier extending through the heat zones and the spirally trending member for moving cans of food therethrough, means including a closed drum for maintaining various temperatures in the heat zones, means connectible to any of the openings for feeding cans therethrough, and means forming part of the carrier for permitting cans to drop from the carrier through the discharge opening of the tank.

In testimony whereof, I affix my signature.

FRANK D. CHAPMAN.